United States Patent [19]

Ross-Clunis

[11] Patent Number: 5,011,174
[45] Date of Patent: Apr. 30, 1991

[54] ADJUSTABLE HEIGHT BICYCLE SEAT MECHANISM

[76] Inventor: Robert A. Ross-Clunis, 2900 Vista Del Rey, NE. Unit 28D, Albuquerque, N. Mex. 87112

[21] Appl. No.: 428,776

[22] Filed: Oct. 30, 1989

[51] Int. Cl.$^5$ .............................................. B62K 1/06
[52] U.S. Cl. .................................. 280/287; 248/161; 248/354.6
[58] Field of Search ................. 280/282, 287; 248/161, 248/162.1, 354.6

[56] References Cited

U.S. PATENT DOCUMENTS

| 626,811 | 6/1899 | Johnson | 280/287 X |
| 4,417,745 | 11/1983 | Shomo | 280/287 |

FOREIGN PATENT DOCUMENTS

| 99276 | 9/1898 | Fed. Rep. of Germany | 280/287 |
| 601294 | 8/1934 | Fed. Rep. of Germany | 280/287 |
| 845614 | 8/1952 | Fed. Rep. of Germany | 280/287 |
| 344191 | 10/1904 | France | 280/287 |
| 418079 | 11/1910 | France | 280/287 |
| 997401 | 1/1952 | France | 280/287 |
| 414450 | of 1946 | Italy | 280/287 |
| 446647 | 10/1949 | Italy | 280/287 |
| 456840 | 4/1950 | Italy | 280/287 |
| 471983 | 2/1953 | Italy | 280/287 |
| 532435 | 1/1941 | United Kingdom | 280/287 |

Primary Examiner—Mark Rosenbaum
Assistant Examiner—Frances Chin
Attorney, Agent, or Firm—Henry M. Bissell

[57] ABSTRACT

A device for use for mounting a bicycle seat onto the frame of a bicycle is disclosed which uses a variable height mechanism which may be quickly and conveniently adjusted between two heights by moving the seat slightly to the side and then up or down to the selected position. A spring is used to provide both a torsion force retaining the mechanism in its locked position until the seat is to be adjusted, and a compressive force to bias the seat into its higher position. A guide mechanism is used to limit the relative movement between a lower segment and an upper segment to two locking positions at opposite ends of a guided vertical relative movement.

25 Claims, 4 Drawing Sheets

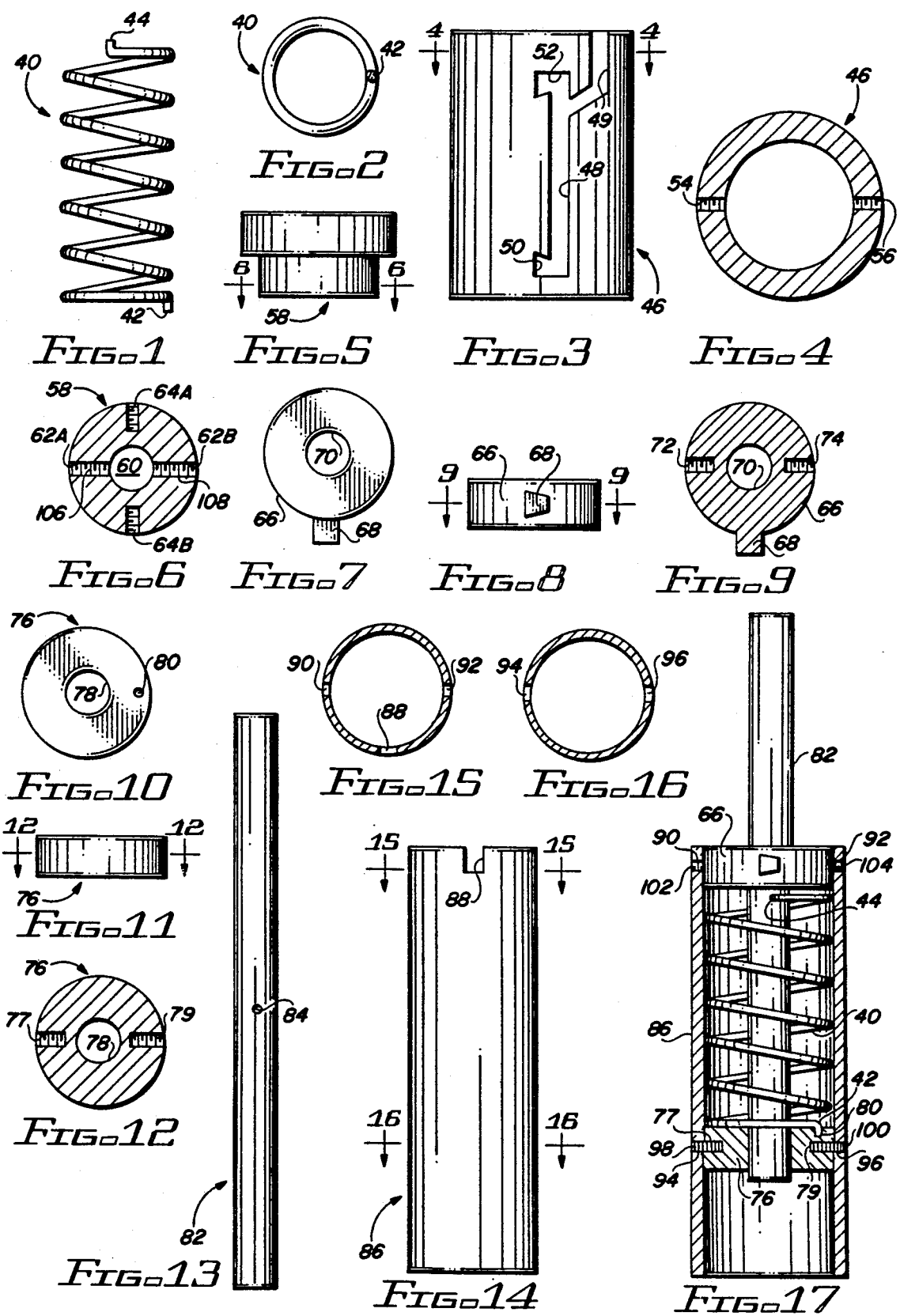

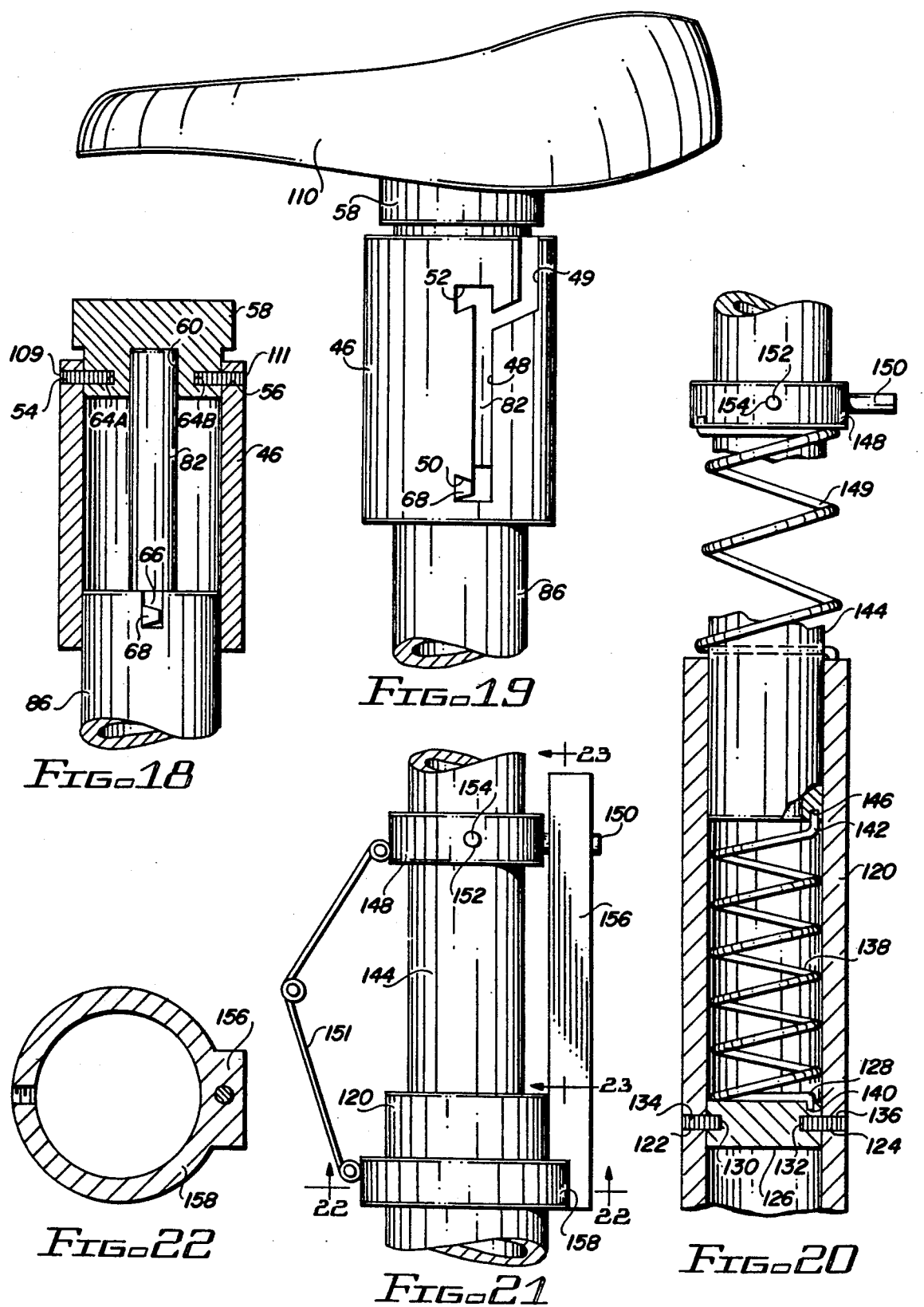

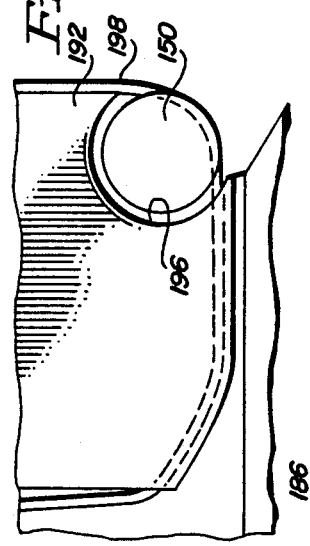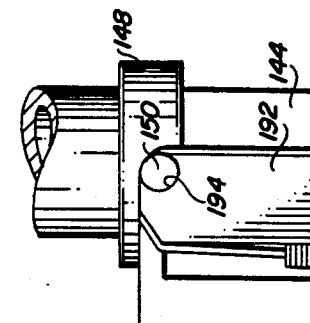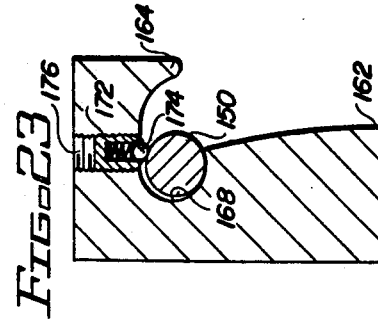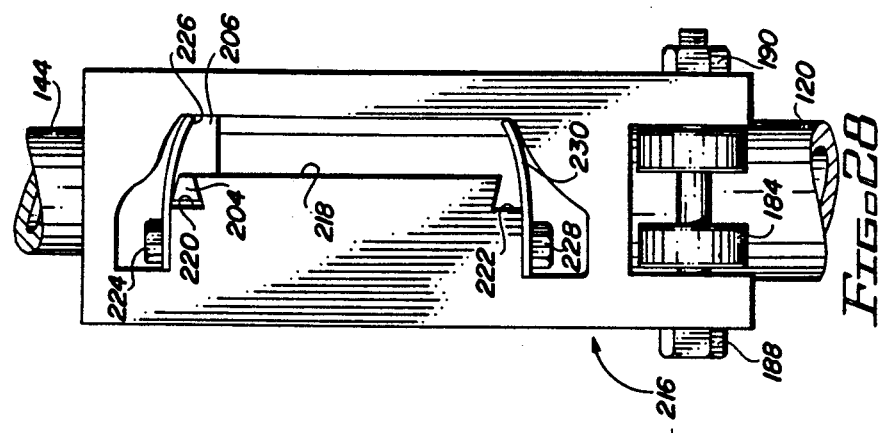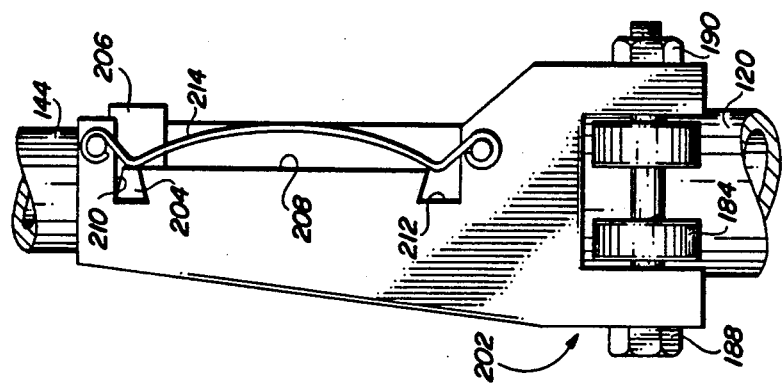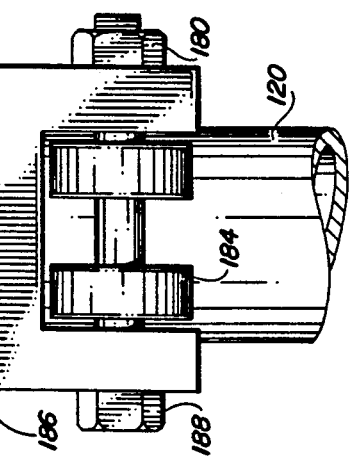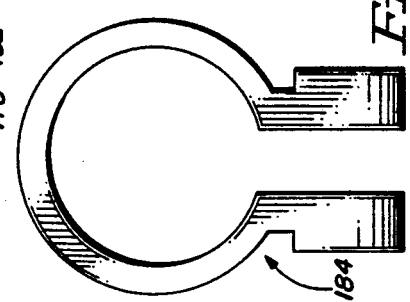

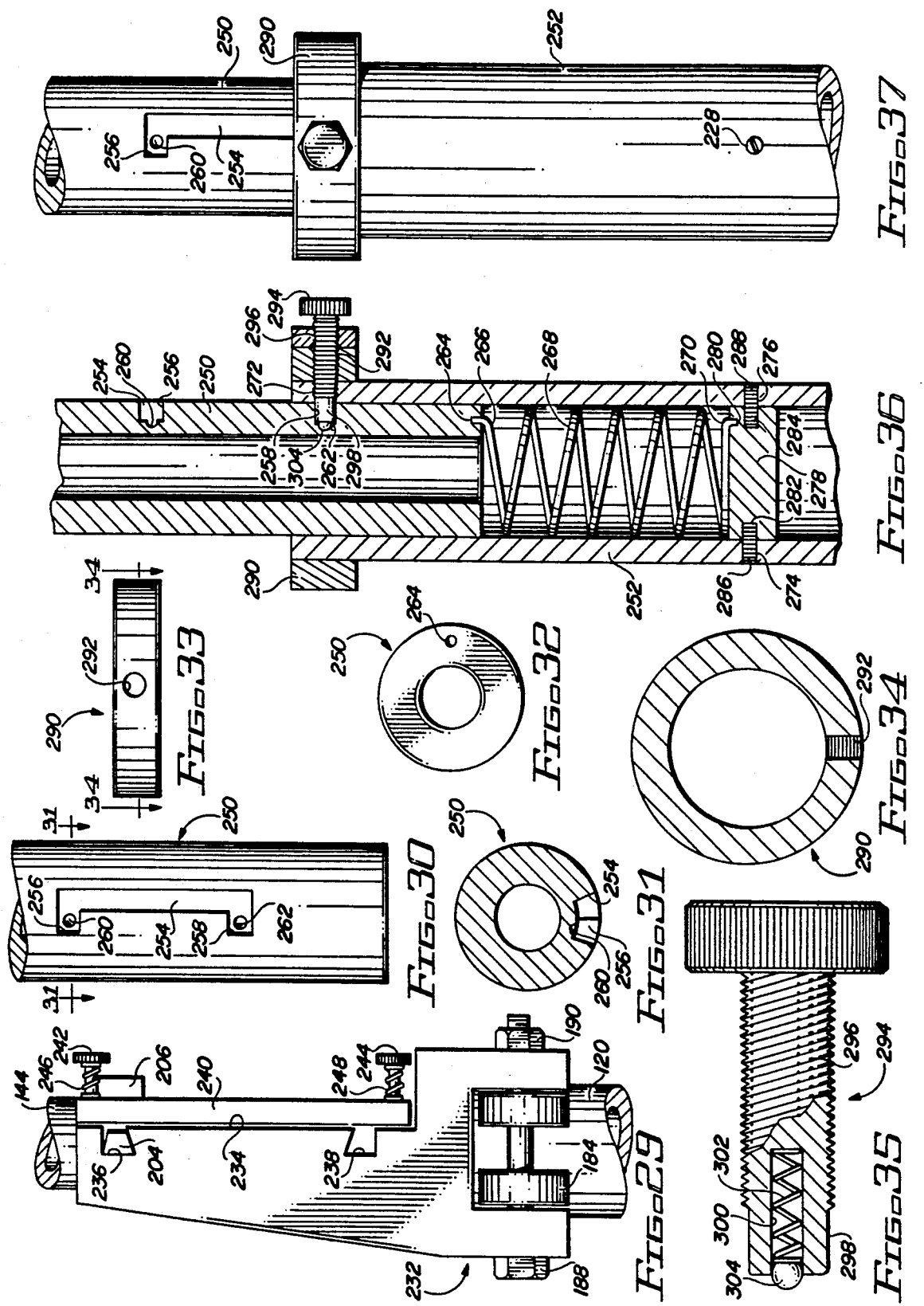

ADJUSTABLE HEIGHT BICYCLE SEAT MECHANISM

BACKGROUND OF THE INVENTION

1. Field of the Invention

The present invention relates generally to apparatus for mounting a bicycle seat on the frame of a bicycle, and more particularly to a variable height mechanism which enables the seat to be readily adjusted between two heights without requiring the rider to dismount or even remove his hands from the handlebar.

2. Description of Related Art

While bicycles have been popular recreational devices for many years, recently a particular type of bicycle has been gaining in popularity. The "mountain bike" has become a hobby for many people, with the area of bicycle technology being greatly stimulated by the demand of serious mountain bike enthusiasts for high tech mountain bikes and accessories. In a rather brief period of time mountain bikes have gone from being essentially modified street bicycles to being sophisticated devices designed to allow the rider the highest possible level of performance over rough terrain. Interest in this sport has expanded to the point that professional racing events for mountain bikes are now commonplace.

In designing a mountain bike for maximum efficiency, one of the problems which has proved difficult to resolve is that of the height of the seat. While in street bicycles the seat height is set to one final height, in mountain bikes it is desirable to have the seat positioned in more than one height depending on the particular terrain being covered at any particular time. For example, if the rider is cruising along relatively smooth terrain, the seat should be located in a high position for maximum riding efficiency. However, if the rider is crossing rugged terrain, particularly on a downhill run, it is desirable to have the seat in a lower position for enhanced control on the rough terrain.

Thus, it is desirable to have the seat height be adjustable in a manner which will be as easy to adjust as is possible. One possible solution is to make the mechanical adjustment of seat height as easy to perform as is possible. The seat is mounted on a seat post, which is inserted into the frame and clamped in the proper position. The popular solution to the problem is to fashion the clamp with a handle-and-cam mechanism on a bolt which locks the clamp. Thus, the adjustment may be performed without the need for tools. It will, however, be recognized that the adjustment generally calls for dismounting and pausing long enough to perform the adjustment or, at the very least, involves a very precarious operation without dismounting.

It is accordingly the primary objective of the present invention that it provide an adjustment mechanism for bicycle seat height which may be operated by a rider while he is on the bike, thus not requiring the rider to dismount or remove his hands from the handlebar to adjust the height of the seat. A feature of the invention is that it does not require additional control levers. It is also a main objective of the present invention that it not require any customizing of the standard frame in order to install the seat adjustment mechanism. The adjustment of the seat should be simple and easy to accomplish, not requiring the concentration of the rider or removal of hands from the handlebar or the added complication of extra cables and levers in order to accomplish the adjustment.

In operation, the adjustment mechanism of the present invention must be dependable and precise in operation, moving smoothly between seat positions and locking securely in each position. The design of the adjustment mechanism should be mechanically simple, thereby making it likely to be durable and long-lasting. It is also desirable that the device of the present invention be economic of manufacture, thereby according it the broadest possible market advantage.

SUMMARY OF THE INVENTION

In brief, particular arrangements of the present invention involve the modification of the seat support mechanism to enable it to be automatically adjustable between upper and lower latched positions. In one particular arrangement, the seat adjustment mechanism is mounted onto the frame, and the seat is mounted on the top of the seat adjustment mechanism. The seat adjustment mechanism essentially consists of a lower tube for mounting in the frame and an upper tube or rod on which the seat is mounted. The upper tube or rod is slideably mounted to the lower tube.

A guide mechanism is used to restrict the relative movement of the upper tube or rod with respect to the lower tube. The guide mechanism includes a guide member which moves in a vertical guide slot having locking slots located laterally from the guide slot at the top and bottom thereof and with the possibility of intermediate locking slots. The guide member is secured to either the upper tube or rod or to the lower tube. The guide slot is secured to the other of the upper tube or rod or the lower tube.

The guide member is moved from one of the locking slots into the guide slot by rotating the upper tube or rod in a first direction (for example clockwise) with respect to the lower tube. With the guide member in the guide slot, the upper tube or rod may be moved up or down with respect to the lower tube. The guide member is moved into one of the locking slots by rotating the upper tube or rod in a direction opposite to the first direction (for example counter-clockwise) with respect to the lower tube.

A spring is mounted between the upper and lower portion of the adjustment mechanism, and is used both in compression and in torsion to bias the upper tube. The compressive force exerted by the spring biases the upper tube or rod upwardly from the lower tube or the frame, to urge the seat mounted on the upper tube or rod upwardly. The torsion force exerted by the spring is used to rotate the upper tube or rod in a direction opposite to the first direction (for example counter-clockwise) with respect to the lower tube or frame. Thus, the torsion force will act to retain the guide member in a locking slot.

In operation, the rider uses a leg (the left leg) to twist the seat, which moves the upper tube or rod against the torsion force of the spring in the first direction (clockwise) with respect to the lower tube or frame, moving the guide member out of the locking slot and into the guide slot. If the seat is to be moved down, the rider sits on the seat to urge it downward against the compressive force of the spring. If the seat is to be moved up, the rider rises off of the seat, allowing the compressive force of the spring to raise the seat.

The seat is thus adjusted to the other height adjustment, whereupon the torsion force of the spring will urge the guide member into the other locking slot, thus locking the seat in the new position. The seat adjustment apparatus of the present invention thus operates quickly and conveniently, allowing the seat height to be raised and lowered without dismounting from the bike or removing hands from the handlebar. A number of different embodiments of the guide mechanism are taught, with all of the embodiments utilizing the same basic operating principles.

It may therefore be seen that the present invention teaches an adjustment mechanism for bicycle seat height which may be operated by a rider while he is on the bike, thus not requiring the rider to dismount, remove his hands from the handlebar, or add special controls to the handlebar to adjust the height of the seat. Installation of the apparatus of the present invention does not require the drilling of any holes in the frame in order to install the seat adjustment mechanism. The adjustment of the seat is simple and easy to accomplish, and does not require the concentration of the rider in order to accomplish the adjustment.

In operation, the adjustment mechanism of the present invention is dependable and crisply precise in operation, moving smoothly between seat positions and locking securely in each position. The design of the adjustment mechanism is mechanically simple, thereby making it durable and long-lasting. The seat adjustment device of the present invention is also economic of manufacture, thereby according it the broadest possible market advantage.

DESCRIPTION OF THE DRAWINGS

A better understanding of the present invention may be realized from a consideration of the following detailed description, taken in conjunction with the accompanying drawing in which:

FIG. 1 is a side plan view of a spring used in the first principal embodiment of the present invention;

FIG. 2 is a bottom plan view of the spring shown in FIG. 1;

FIG. 3 is a side plan view of a guide tube containing the guide slot and two locking slots therein;

FIG. 4 is a sectional view of the guide tube shown in FIG. 3;

FIG. 5 is a side plan view of a seat mounting member upon which a bicycle seat will be mounted;

FIG. 6 is a sectional view of the seat mounting member shown in FIG. 5;

FIG. 7 is a top plan view of a bushing containing a guide member disposed on the side of the bushing;

FIG. 8 is a side plan view of the bushing and guide member shown in FIG. 7;

FIG. 9 is a sectional view of the bushing and guide member shown in FIGS. 7 and 8;

FIG. 10 is a top plan view of a bushing showing an aperture used to secure the bottom end of the spring shown in FIGS. 1 and 2;

FIG. 11 is a side plan view of the bushing shown in FIG. 10;

FIG. 12 is a sectional view of the bushing shown in FIGS. 10 and 11;

FIG. 13 is a side plan view of an upper rod;

FIG. 14 is a side plan view of a lower tube showing a notch in the top edge thereof for receiving the guide member shown in FIG. 8;

FIG. 15 is a first sectional view of the lower tube shown in FIG. 14;

FIG. 16 is a second sectional view of the lower tube shown in FIG. 14;

FIG. 17 is a side view showing the assembly of the upper rod, the bushings, and the spring in the lower tube, with the lower tube cut away for clarity;

FIG. 18 is a side view showing the assembly of the seat mounting member and the guide tube to the upper end of the upper rod, with the guide tube cut away for clarity;

FIG. 19 is a side view showing the assembled seat height adjustment device of the present invention, with the seat in its upper position;

FIG. 20 is a cutaway view of a first variation of the seat height adjustment device of the present invention with the guide member removed for clarity, showing an upper tube instead of the upper rod and an alternate guide member;

FIG. 21 is a fully assembled side view of the device shown in FIG. 20;

FIG. 22 is a cutaway view of the guide member of the device shown in FIG. 21 showing how it attaches to the lower tube;

FIG. 23 is a view from the rear of a portion of the guide member of the device shown in FIG. 21;

FIG. 24 is a view from the rear of a second variation of the seat height adjustment device of the present invention with a guide member different from that shown in FIG. 23;

FIG. 25 is a top plan view of the frame clamp used to mount the guide member of FIG. 24;

FIG. 26 is an enlarged view of a portion of the guide member of the device shown in FIG. 24;

FIG. 27 is a view from the rear of a third variation of the seat height adjustment device of the present invention with still a different guide member;

FIG. 28 is a view from the rear of a fourth variation of the seat height adjustment device of the present invention with yet another different guide member;

FIG. 29 is a view from the rear of a fifth variation of the seat height adjustment device of the present invention with an additional different guide member;

FIG. 30 is a side plan view of an upper tube used in the second principal embodiment of the present invention, showing a guide slot and locking slots milled into the upper tube and detent dimples located in the locking slots;

FIG. 31 is a sectional view of the upper tube shown in FIG. 30;

FIG. 32 is a bottom view of the upper tube shown in FIG. 30, showing an aperture used to secure the upper end of a spring;

FIG. 33 is a side plan view of a guide collar having an aperture in the side thereof;

FIG. 34 is a sectional view of the guide collar shown in FIG. 33;

FIG. 35 is a side view of an adjustable guide bolt which is partially cut away to show a spring-loaded detent ball;

FIG. 36 is side view of the assembled device of the second embodiment, showing the operation of the adjustable guide bolt and detent ball in engaging the lower locking slot; and FIG. 37 is a view from the rear of the assembled device shown in FIG. 36.

DETAILED DESCRIPTION OF THE PREFERRED EMBODIMENTS

One preferred embodiment of the present invention uses a seat height adjustment apparatus having an upper portion and a lower portion, with relative movement between the upper and lower portions being biased by a spring 40, which is shown in FIGS. 1 and 2. The lower end 42 of the spring 40 is angled downward, as shown in FIG. 1. The upper end 44 of the spring 40 is upwardly directed, also as shown in FIG. 1. The spring 40 is used to provide both compressive and torsion forces.

Referring next to FIGS. 3 and 4, a hollow cylindrical guide tube 46 is shown. In the preferred embodiment, the guide tube 46 is made of Delrin. In the side of the guide tube 46 is a vertically extending guide slot 48 branching to an entry slot 49. The height of the guide slot 48 is equal to the amount of travel desired in the height of the seat. Located to the left side of the guide slot 48 at the bottom thereof is a locking slot 50. Similarly, located to the left side of the guide slot 48 at the top thereof is a locking slot 52.

The locking slots 50 and 52 thus project off to one side of the guide slot 48. The guide slot 48 and the locking slots 50 and 52 are sided to accommodate a guide member, which will be described below. Located near the top of the guide tube 46 on opposing sides are a pair of threaded apertures 54 and 56 extending through the sides of the guide tube 46. The threaded apertures 54 and 56 will be used to mount the guide tube 46, as will become evident below.

Referring next to FIGS. 5 and 6, a seat mounting member 58 is illustrated. The lower portion of the seat mounting member 58 has a centrally located aperture 60 therein for receiving a rod or tube (not shown). Also located in the lower portion of the seat mounting member 58 on opposing sides are a pair of threaded apertures 62A, 62B, which extend to the central aperture 60. In addition, there are a second pair of apertures 64 which are blind holes, terminating short of the central aperture 60. The outer diameter of the lower portion of the seat mounting member 58 is approximately the same as the inner diameter of the guide tube 46. The configuration of the upper portion of the seat mounting member 58 is unimportant to the present invention, and may be any configuration designed to attach to a bicycle seat (not shown). It is shown as being cylindrical in FIG. 5.

Referring next to FIGS. 7 through 9, a cylindrical bushing 66 is illustrated which has a guide member 68 extending from the side thereof. The bushing 66 has a centrally located aperture 70 extending therethrough. The guide member 68 extends outwardly from the side of the bushing 66, and is configured to fit within the guide slot 48 and the locking slots 50 and 52. Also located in the bushing 66 on opposing sides are a pair of threaded apertures 72 and 74, which extend to the aperture 70. In the preferred embodiment, the bushing 66 and the guide member 68 are made of aluminum. Stainless steel or titanium may also be used.

Referring now to FIGS. 10 through 12, a bushing 76 is illustrated. The bushing 76 has a centrally located aperture 78 extending therethrough. The bushing 76 has an aperture 80 located in the top side thereof, as shown in FIG. 10. The lower end 42 of the spring 40 (FIG. 1) will fit into the aperture 80. Also located in the bushing 76 on opposing sides are a pair of threaded apertures 77 and 79, which do not extend to the aperture 70.

Referring next to FIG. 13, an upper rod 82 is illustrated. The upper rod 82 has an aperture 84 located in the side thereof. The upper end 44 of the spring 40 (FIG. 1) will fit into the aperture 84. The diameter of the upper rod 82 is approximately the same as the diameter of the aperture 60 in the lower portion of the seat mounting member 58 (FIG. 6). The diameters of the bushing 66 (FIG. 7) and the bushing 76 (FIG. 10) are designed to allow the upper rod 82 to move freely therethrough.

Referring next to FIG. 14, a hollow cylindrical lower tube 86 is illustrated. The lower tube 86 has a notch 88 in the top edge for receiving the guide member 68 (FIG. 8). The bushing 66 and the bushing 76 have approximately the same outer diameters as the inner diameter of the lower tube 86. The inner diameter of the guide tube 46 (FIG. 3) is just slightly larger than the outer diameter of the lower tube 86. Located near the top of the lower tube 86 on opposing sides are a pair of apertures 90 and 92, which extend through the sides of the lower tube 86. Also located further down on the lower tube 86 on opposing sides are a pair of apertures 94 and 96, which also extend through the sides of the lower tube 86.

The assembly of the various components described above into the lower tube 86 may be described with reference to FIG. 17. The bushing 76 is inserted into the interior of the lower tube 86 with the aperture 80 in the bushing 76 facing upward. An Allen screw 98 is screwed through the aperture 94 in the lower tube 86 into the threaded aperture 77 in the bushing 76. Similarly, an Allen screw 100 is screwed through the aperture 96 in the lower tube 86 into the threaded aperture 79 in the bushing 76.

The spring 40 is inserted into the lower tube 86 with the lower end 42 of the spring 40 first. The lower end 42 of the spring 40 is inserted into the aperture 80 in the top of the bushing 76. The upper rod 82 is inserted into the lower tube 86 from the top, and the upper end 44 of the spring 40 is inserted into the aperture 84 in the upper rod 82. The lower end of the upper rod 82 is inserted into the aperture 78 in the bushing 76.

The upper end of the upper rod 82 is placed through the aperture 70 in the bushing 66. The bushing 66 is then inserted into the top end of the lower tube 86 with the guide member 68 fitting through the notch 88 in the lower tube 86. (As this is done, the spring 40 will be compressed.) An Allen screw 102 is screwed through the aperture 90 in the lower tube 86 into the threaded aperture 72 in the bushing 66. Similarly, an Allen screw 104 is screwed through the aperture 92 in the lower tube 86 into the threaded aperture 74 in the bushing 66.

Referring next to FIGS. 18 and 19, the balance of the construction of the seat adjustment mechanism is illustrated. The bottom of the guide tube 46 is installed from the lower side, routing the guide 68 through the installation slot 49, with the guide member 68 fitting into the guide slot 48 or the locking slot 50 as shown in FIG. 19. The top of the upper rod 82 inserted into the aperture 60 in the lower portion of the seat mounting member 58. An Allen screw 106 (FIG. 6) is inserted through the threaded aperture 62A in the seat mounting member 58, and is tightened on the upper rod 82. Similarly, an Allen screw 108 is inserted through the threaded aperture 62B in the seat mounting member 58, and is tightened on the upper rod 82.

The upper end of the upper rod 82 and seat mounting member 58 are rotated clockwise (as viewed from the top) to tighten the spring 40 in a torsion manner. The Allen screws 109 and 111 are inserted through apertures 54 and 56 in guide tube 46 and threaded into bores 64A, 64B of the seat mounting member 58, securing the seat mounting member 58 and the guide tube 46 to each other. The torsion force of the spring will thus urge the adjacent locking slot 50 or 52 in the guide tube 46 into contact with the guide member 68. This will keep the guide member 68 from entering the guide slot 48 unless the bicycle seat 110, which is mounted on the seat mounting member 58, is moved clockwise (viewed from the top of the seat 110).

Thus, with the guide member 68 in the locking slot 50, to lower the seat 110 the front of the seat 110 is twisted clockwise with the rider's left leg (not shown) to move the guide member 68 into the guide slot 48 at the bottom thereof. The rider then sits on the seat 110, further compressing the spring 40 and moving the guide member 68 to the top of the guide slot 48. At this point, the torsion force of the spring 40 will urge the seat 110 counterclockwise, moving the guide member 68 into the locking slot 52.

With the guide member 68 in the locking slot 52, to raise the seat 110 the front of the seat 110 is twisted clockwise with the rider's left leg (not shown) to move the guide member 68 into the guide slot 48 at the top thereof. The rider then rises off of the seat 110, allowing the compressive force of the spring 40 to bring the seat 110 upwards, moving the guide member 68 to the bottom of the guide slot 48. At this point, the torsion force of the spring 40 will urge the seat 110 counterclockwise, moving the guide member 68 into the locking slot 50.

In this first preferred embodiment of the seat adjustment mechanism, the guide slot 48 is mounted on the upper rod 82 and the guide member 68 is mounted on the lower tube 86. It would be equally possible to mount a guide slot on the lower tube and a guide member on an upper tube or rod. The alternate embodiments shown in FIGS. 20 through 29 show just such arrangements.

FIGS. 20–23

FIGS. 20 through 23 show a first alternate embodiment using a lower tube 120. The lower tube 120 has a pair of apertures 122 and 124 located on opposing sides thereof in approximately the same location as the pair of apertures 94 and 96 on the lower tube 86 (FIG. 14). The pair of apertures 122 and 124 also extend through the sides of the lower tube 120. Located in the interior of the lower tube 120 is a bushing 126, which has an aperture 128 located in the top side thereof. The diameter of the bushing 126 is approximately the same as the inner diameter of the lower tube 120.

Also located in the bushing 126 on opposing sides are a pair of threaded apertures 130 and 132. An Allen screw 134 is screwed through the aperture 122 in the lower tube 120 into the threaded aperture 130 in the bushing 126. Similarly, an Allen screw 136 is screwed through the aperture 124 in the lower tube 120 into the threaded aperture 132 in the bushing 126.

Also located in the lower tube 120 is a spring 138. The lower end 140 of the spring 138 is angled downward, and is located in the aperture 128 in the top of the bushing 126. The upper end 142 of the spring 138 is angled upward. Slideably mounted in the top end of the lower tube 120 is an upper tube 144. The outer diameter of the upper tube 144 is slightly smaller than the inner diameter of the lower tube 120, so the upper tube 144 may slide freely in the lower tube 120. Located on the bottom end of the upper tube 144 is an aperture 146, in which is located the upper end 142 of the spring 138. FIGS. 20 and 21 also show different types of external springs 149 and 151 which may also be employed.

Mounted on the upper tube 144 is a collar 148 having a guide member 150 extending therefrom. The collar 148 is preferably fastened onto the upper tube 144 using an Allen screw 152 located in a threaded aperture 154 in the collar 148. Referring next particularly to FIGS. 21 and 22, a guide assembly 156 is illustrated which is mounted on the lower tube 120 near the top thereof using a clamp 158. The clamp 158 has an inner diameter which is approximately the same as the outer diameter of the lower tube 120. A threaded aperture 160 is located in the side of the clamp 158, and an Allen screw (not shown) is used to retain the clamp 158 in place on the lower tube 120.

The details of the guide assembly 156 are shown in FIG. 23. A guide ramp 162 is located on the side of the guide assembly 156, and a pair of guide fingers 164 and 166 together with the guide ramp 162 form the guide slot. The guide finger 164 is at the top and is directed downward, and the guide finger 166 is at the bottom and is directed upward. There is a locking slot 168 at the top and to the left of the guide ramp 162. Likewise, there is a locking slot 170 at the bottom and to the left of the guide ramp 162.

An Allen screw 172 having a spring loaded detent ball 174 is located in a threaded aperture 176 in the top of the guide assembly 156. The detent ball 174 is located in the top of the locking slot 168, and will act to retain the guide member 150 in the locking slot 168 when it is so located. Similarly, an Allen screw 178 having a spring loaded detent ball 180 is located in a threaded aperture 182 in the bottom of the guide assembly 156. The detent ball 180 is located in the bottom of the locking slot 170, and will act to retain the guide member 150 in the locking slot 170 when it is so located.

In the first alternate embodiment, the guide member rather than the guide slot moves. Otherwise, the operation of the first alternate embodiment is substantially identical to the operation of the preferred embodiment. Those skilled in the art will readily understand the operation of the device illustrated in FIG. 23, and thus its operation will not be further explained herein.

FIGS. 24–26

Referring now to FIGS. 24 through 26, a second alternate embodiment is illustrated which also utilizes the collar 148 and the guide member 150 mounted on the upper tube 144. A standard frame clamp 184 is used to mount a guide assembly 186 onto the lower tube 120 near the top thereof. A bolt 188 and a nut 190 are used to fasten the guide assembly 186 to the clamp 184. If preferred, the guide assembly 186 may be mounted directly to the frame of the bicycle where the seat post normally mounts, in which case reference numeral 120 would designate the frame.

The guide assembly 186 has a guide projection 192 having a locking slot 194 in the upper right corner, and a locking slot 196 in the lower right corner. A wire cable 198 fits around the perimeter of the guide projection 192, and is spring loaded using a spring 200 attached to the ends of the wire cable 198. The spring-loaded wire cable 198 thus acts to keep the guide member 150 in the locking slot 194 when it is so disposed, or, alternately, in the locking slot 196 when it is so disposed. Operation of the device of FIG. 24 is no different from operation of the device of FIG. 23.

In the preferred construction of the device of FIGS. 24 through 26, the cable is located in an undercut portion on the top and on the bottom of the guide projection 192, as shown in FIG. 26. This acts to retain the wire cable 198 in place on the guide projection 192. In addition, the guide member 150 may also be scored as shown to help guide the guide member 150 between positions at the top and at the bottom of the guide assembly 186.

FIG. 27

Referring next to FIG. 27, a third alternate embodiment is illustrated in which a guide assembly 202 is mounted onto the lower tube 120 using the frame clamp 184. A guide member 204 is supported by a collar 206 mounted on the upper tube 144. The guide assembly 202 has a vertical guide edge 208 on the right side thereof, with a locking slot 210 located above and to the left of the guide edge 208, and a locking slot 212 located below and to the left of the guide edge 208.

Located to the right of the guide edge 208 is a spring 214 which is supported at the ends thereof above and below the level of the guide edge 208. The spring 214 acts to retain the guide member 204 in the locking slot 210 when the guide member 204 is so situated, and in the locking slot 212 when the guide member 204 is so situated. When the guide member 204 is not in either the locking slot 210 or the locking slot 212, the spring 214 keeps the guide member 204 against the guide edge 208 of the guide assembly 202. Operation of the device shown in FIG. 27 is similar to operation of the devices taught above.

FIG. 28

Referring next to FIG. 28, a fourth alternate embodiment is illustrated in which a guide assembly 216 is mounted onto the lower tube 120 using the frame clamp 184. The guide assembly 216 has a vertical guide slot 218 therein. Located above and to the left of the guide slot 218 is a locking slot 220, and located below and to the left of the guide slot 218 is a locking slot 222. Note that the guide member 204 most move up slightly and to the right to get from the locking slot 220 to the guide slot 218. Similarly, the guide member 204 must move down slightly and to the right to get from the locking slot 222 to the guide slot 218.

Mounted onto the guide assembly 216 using a bolt 224 is a spring 226 which bears down over the locking slot 220 and the top of the guide slot 218. The spring 226 will retain the guide member 204 in the locking slot 220 when it is so situated. Similarly, mounted onto the guide assembly 216 using a bolt 228 is a spring 230 which bears up under the locking slot 222 and the bottom of the guide slot 218. The spring 230 will retain the guide member 204 in the locking slot 222 when it is so situated. Operation of the device shown in FIG. 28 is similar to operation of the devices taught above.

FIG. 29

Referring next to FIG. 29, a fifth alternate embodiment is illustrated in which a guide assembly 232 is mounted onto the lower tube 120 using the frame clamp 184. The guide assembly 232 has a vertical guide edge 234 on the right side thereof, with a locking slot 236 located above and to the left of the guide edge 234, and locking slot 238 located below and to the left of the guide edge 234. A guide bar 240 is located to the right of the guide edge 234 and the locking slots 236 and 238.

The guide bar 240 is mounted at the top end thereof using a bolt 242 extending through an aperture in the guide bar 240, with the bolt 242 being anchored in the guide assembly 232. Similarly, the guide bar 240 is mounted at the bottom end thereof using a bolt 244 extending through an aperture in the guide bar 240, with the bolt 244 also being anchored in the guide assembly 232. The guide bar 240 may thus move toward and away from the guide edge 234. However, the guide bar 240 is biased toward the guide edge 234 using a spring 246 mounted on the bolt 242, and a spring 248 mounted on the bolt 244.

Thus, the guide member 204 will be retained in the locking slot 236 when it is so situated by the guide bar 240. Similarly, the guide member 204 will be located in the locking slot 238 when it is so situated by the guide bar 240. Operation of the device shown in FIG. 29 is similar to operation of the devices taught above.

As was described in connection with the embodiment of FIGS. 24–26, the operative guide assembly of each of the embodiments of FIGS. 27, 28 and 29 may be installed directly on the bicycle frame seat mounting portion 120 without the interposition of a second tube, if desired.

FIGS. 30–37

The second preferred embodiment of the present invention is illustrated in FIGS. 30 through 37, which use an upper tube 250 mounted in a lower tube 252. The upper tube 250 is shown in FIGS. 30 through 32, and has a vertical guide slot 254 milled into the side of the upper tube 250. At the top end and to the left of the guide slot 254 a locking slot 256 is milled, and at the bottom end and to the left of the guide slot 254 a locking slot 258 is milled.

A detent dimple 260 is drilled into the center of the locking slot 256, and a detent dimple 262 is drilled into the center of the locking slot 258. Located on the bottom end of the upper tube 250 is an aperture 264, in which will be located the upper end 266 of a spring 268 (FIG. 36), which upper end 266 is angled upward. The spring 268 also has a lower end 270, which is angled downward.

The lower tube 252 is illustrated in FIG. 36, and is a hollow cylinder having an inner diameter slightly larger than the outer diameter of the upper tube 250. The lower tube 252 has aperture 272 drilled in the side thereof near the top end thereof, which will be used to mount the guide member. The lower tube 252 has a pair of apertures 274 and 276 located on opposing sides thereof in approximately the same location as the pair of apertures 94 and 96 on the lower tube 86 (FIG. 14).

Located in the interior of the lower tube 120 is a bushing 278, which has an aperture 280 located in the top side thereof. The diameter of the bushing 278 is approximately the same as the inner diameter of the lower tube 252. Also located in the bushing 126 on opposing sides are a pair of threaded apertures 282 and 284. An Allen screw 286 is screwed through the aperture 274 in the lower tube 252 into the threaded aperture 282 in the bushing 278. Similarly, an Allen screw 288 is screwed through the aperture 276 in the lower tube 252 into the threaded aperture 284 in the bushing 278.

Also located in the lower tube 252 is the spring 268. The lower end 270 of the spring 268 is located in the aperture 280 in the top of the bushing 278. Slideably mounted in the top end of the lower tube 252 is the upper tube 254. The outer diameter of the upper tube 250 is slightly smaller than the inner diameter of the lower tube 252, so the upper tube 250 may slide freely in the lower tube 252. The upper end 266 of the spring 268 is located in the aperture 264 in the bottom of the upper tube 250.

Referring next to FIGS. 33 and 34, a hollow cylindrical guide collar 290 is illustrated which has an inner diameter which is approximately the same size as the outer diameter of the lower tube 252. The guide collar 290 has a threaded aperture 292 in the side thereof. The guide collar 290 fits over the top end of the lower tube 252 as shown in FIG. 36, with the threaded aperture 292 in the guide collar 290 aligned with the aperture 272 in the lower tube 252.

Referring next to FIG. 35, a guide bolt 294 is illustrated which has a threaded portion 296, and a non-threaded portion 298 distal to the threaded portion 296. The size of the threaded portion 296 is designed to allow the threaded portion 296 to screw into the threaded aperture 292 in the guide collar 290. Note that the aperture 272 in the lower tube 252 is larger than the threaded portion 296 of the guide bolt 294.

Located in the distal end of the guide bolt 294 is an aperture 300 in which is mounted a spring 302, which biases a detent ball 304 which partly extends from the end of the aperture 300 in the guide bolt 294. Referring now to FIG. 36, the final assembly of the device may now be described. The upper tube 250 is rotated clockwise (when viewed from above) to torque bias the spring 268. With the upper tube 250 in the position shown in the lower tube 252, the spring 268 is already in compression.

The guide bolt 294 is screwed into the threaded aperture 292 in the guide collar 290, so that the non-threaded portion 298 of the guide bolt 294 extends through the aperture 272 in the lower tube 252 into the locking slot 258 in the upper tube 250. In this position, the detent ball 304 will be spring biased into the detent dimple 262 in the locking slot 258. This completes the assembly of the height adjustment mechanism.

The operation of the device may be described with reference to FIGS. 36 and 37. With the non-threaded portion 298 of the guide bolt 294 in the locking slot 258, the torsion bias of the spring 268 will retain the non-threaded portion 298 in the locking slot 258. By turning the upper tube 250 counter-clockwise (when viewed from above) by the rider using his left leg to bias the bicycle seat (not shown), the detent ball 304 will be forced out of the detent dimple 262 and the non-threaded portion 298 of the guide bolt 294 will move from the locking slot 258 to the bottom of the guide slot 254.

By pushing down on the seat (and down on the lower tube 252), the non-threaded portion 298 of the guide bolt 294 will move from the bottom of the guide slot 254 to the top of the guide slot 254. At this point, the torsion bias of the spring 268 will urge the non-threaded portion 298 of the guide bolt 294 from the top of the guide slot 254 into the locking slot 256, where the detent ball 304 will fit into the detent dimple 260 in the locking slot 256. Thus, the apparatus moves the bicycle seat to the lower position.

With the non-threaded portion 298 of the guide bolt 294 in the locking slot 256, the torsion bias of the spring 268 will retain the non-threaded portion 298 in the locking slot 256. To raise the seat, the upper tube 250 is turned counter-clockwise (when viewed from above) by the rider using his left leg to bias the bicycle seat (not shown), forcing the detent ball 304 out of the detent dimple 260 and the non-threaded portion 298 of the guide bolt 294 from the locking slot 256 to the top of the guide slot 254.

By lifting off of the seat, the compressed spring 268 will move the non-threaded portion 298 of the guide bolt 294 from top of the guide slot 254 to the bottom of the guide slot 254. At this point, the torsion bias of the spring 268 will urge the non-threaded threaded portion 298 of the guide bolt 294 from the bottom of the guide slot 254 into the locking slot 258, where the detent ball 304 will fit into the detent dimple 262 in the locking slot 258. Thus, the apparatus moves the bicycle seat to the higher position.

It may therefore be appreciated from the above detailed description of the preferred embodiment of the present invention that it teaches an adjustment mechanism for bicycle seat height which may be operated by a rider while he is on the bike, thus not requiring the rider to dismount or to remove his hands from the handlebar to adjust the height of the seat. Installation of the apparatus of the present invention does not require the drilling of any holes in the frame in order to install the seat adjustment mechanism. The adjustment of the seat is simple and easy to accomplish, and does not require the concentration of the rider in order to accomplish the adjustment.

Although exemplary embodiments of the present invention have been shown and described hereinabove, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention as defined in the accompanying claims.

What is claimed is:

1. A height adjustable device for mounting a bicycle seat onto the frame of a bicycle, comprising:
    a hollow lower tube member;
    spring means for providing both a torsion and a compressive biasing force, said spring means having a first end and a second end, said first end of said spring means being secured relative to said lower tube member;
    an upper member installed in and extending from said lower tube member, said upper member being longitudinally slidable and rotatable with respect to said lower tube member, said second end of said spring means being secured relative to said upper member;
    first guide means mounted on said lower tube member; and
    second guide means mounted on said upper tube member, said first and second guide means cooperating to limit the longitudinal movement of said upper member with respect to said lower tube member between a raised position and a lowered position, said first and second guide means allowing relative rotation of said upper member with respect to said lower tube member between locked and unlocked positions at either said raised position or said lowered position.

2. A height adjustable device for mounting a bicycle seat onto the frame of a bicycle, comprising:

a lower tube member for mounting onto the frame of the bicycle, said lower tube member being hollow;

spring means for providing both a torsion and a compressive biasing force, said spring means having a first end and a second end, said first end of said spring means being secured relative to said lower tube member;

an upper member installed in and extending from said lower tube member, the bicycle seat being mounted on said upper member, said upper member being longitudinally slidable and rotatable with respect to said lower tube member, said second end of said spring means being secured relative to said upper member, said spring means urging said upper member longitudinally out of said lower tube member, said spring means also urging said upper member to rotate in a first direction with respect to said lower tube member;

first guide means mounted on said lower tube member; and second guide means mounted on said upper member, said first and second guide means cooperating to limit the longitudinal movement of said upper member with respect to said lower tube member between a raised position and a lowered position, said first and second guide means allowing relative rotation of said upper member with respect to said lower tube member between locked and unlocked positions at either said raised position or said lowered position, said first and second guide means moving from said unlocked position to said locked position when said upper member rotates in said first direction with respect to said lower tube member.

3. A height adjustable device for mounting a bicycle seat onto the frame of a bicycle, comprising:

a lower tube member for mounting onto the frame of the bicycle, said lower tube member being hollow;

spring means for providing both a torsion and a compressive biasing force, said spring means having a first end and a second end, said first end of said spring means being secured relative to said lower tube member;

an upper member installed in and extending from said lower tube member, the bicycle seat being mounted on said upper member, said upper member being longitudinally slidable and rotatable with respect to said lower tube member, said second end of said spring means being secured relative to said upper member, said spring means urging said upper member longitudinally out of said lower tube member, said spring means also urging said upper member to rotate in a first direction with respect to said lower tube member;

first guide means mounted on said lower tube member; and second guide means mounted on said upper member, said first and second guide means cooperating to limit the longitudinal movement of said upper member with respect to said lower tube member between a raised position and a lowered position, said first and second guide means allowing relative rotation of said upper member with respect to said lower tube member between locked and unlocked positions at either said raised position or said lowered position.

4. A height adjustable device as defined in claim 3, wherein said upper member comprises an upper rod, additionally comprising:

a first bushing mounted in the end of said lower tube member from which said upper rod extends, said first bushing having an aperture therethrough through which said upper rod extends; and a second bushing mounted in said lower tube, said second bushing having an aperture therethrough through which said upper rod extends.

5. A height adjustable device as defined in claim 4, wherein said second bushing has a small aperture in the side thereof facing said first bushing, said first end of said spring being secured in said small aperture in the second bushing, and wherein said upper rod has an aperture therethrough, said second end of said spring being secured in said aperture in said upper rod.

6. A height adjustable device as defined in claim 3, wherein said upper member comprises an upper tube member, said upper tube member being hollow, the outer diameter of said upper tube member being slightly less than the inner diameter of said lower tube member.

7. A telescoping guide assembly for mounting a bicycle seat to the frame of a bicycle so that the seat may be readily adjusted in height by a rider without requiring use of the rider's hands, the assembly comprising:

first and second members which are both rotatable and axially slidable relative to each other, the first member being adapted to receive the second member in telescoping relationship therein;

the first member having a lower portion including adjustable clamping means for installing the assembly on the frame of the bicycle;

the second member including a tube having a portion adapted for mounting a bicycle seat thereon;

'spring means having opposite ends anchored to said first and second members, respectively, said spring means being biased to develop both rotational and longitudinal forces between said first and second members;

first guide means mounted on said first member; and second guide means mounted on said second member, said first and second guide means cooperating to guide the telescoping action of the first and second members between upper and lower stop positions, which stop positions are engaged by rotation of the second member relative to the first member in response to said spring means.

8. An assembly as defined in claim 7, wherein said first guide means comprises:

a guide member; and wherein said second guide means comprises:

a guide slot having a locking slot disposed on each end of said guide slot.

9. An assembly as defined in claim 8, wherein said guide member extends outward from said first member.

10. An assembly as defined in claim 9, wherein said second guide means comprises a hollow guide tube mounted on said second member, said hollow guide tube extending at least partially over said first member, said hollow guide tube having said guide slot disposed longitudinally therein, said locking slots being disposed at opposite end of said guide slot on one side thereof.

11. An assembly as defined in claim 10, wherein rotation of said first member with respect to said second member tends to move said guide member into one of said locking slots if said guide member is at one end of said guide slot.

12. An assembly as defined in claim 7, wherein said second guide means comprises:
 a longitudinal guide slot located in an exterior surface of said second member, a locking slot being located in the exterior surface of said second member on one side of said guide slot at opposite ends thereof; and wherein said first guide means comprises:
 a guide member projecting inwardly from said first member near thereof, said guide member being located in said guide slot or in one of said locking slots.

13. An assembly as defined in claim 12, wherein said guide member comprises a guide bolt screwed into said first member, the inner end of said bolt being located in said guide slot or in one of said locking slots.

14. An assembly as defined in claim 13, additionally comprising a detent dimple located in each of said locking slots and a spring loaded detent ball located in the distal end of said guide bolt.

15. An assembly as defined in claim 13, wherein rotation of said first member with respect to said second member tends to move said distal end of said guide bolt into one of said locking slots if said distal end of said guide bolt is at one end of said guide slot.

16. An assembly as defined in claim 7, wherein said second guide means comprises:
 a guide member mounted on said second member, said guide member projecting outward from said second guide means; and wherein said first guide means comprises:
 a guide assembly defining a longitudinal slot in which said guide member may move as said upper member moves longitudinally with respect to said lower tube member, said guide assembly also having locking slots disposed to one side of said longitudinal slot at respective opposite ends thereof.

17. An assembly as defined in claim 16, wherein rotational movement of said second member with respect to said first member tends to move said guide member into one of said locking slots when said guide member is at one end of said longitudinal slot.

18. An assembly as defined in claim 17, additionally comprising detent means for retaining said guide member in one of said locking slots once said guide member is so disposed.

19. An assembly as defined in claim 17, additionally comprising a spring-loaded cable disposed along said one side of said longitudinal slot adjacent said locking slots, said spring-loaded cable tending to retain said guide member in one of said locking slots once said guide member is so disposed.

20. An assembly as defined in claim 17, additionally comprising second spring means for urging said guide member in a direction toward said locking slots, said second spring means tending to retain, said guide member in one of said locking slots once said guide member is so disposed.

21. An assembly as defined in claim 17, additionally comprising a first spring mounted on said guide assembly to urge said guide member to remain in one of said locking slots when it is so disposed and a second spring mounted on said guide assembly to urge said guide member to remain in the other of said locking slots when it is so disposed.

22. An assembly as defined in claim 17, additionally comprising a spring-loaded bar for urging said guide member in a direction toward said locking slots, said spring-loaded bar tending to retain said guide member in one of said locking slots once said guide member is so disposed.

23. The assembly of claim 7 wherein one of said members includes a means defining a pair of recesses at said upper and lower stop positions and a keyway extending longitudinally between said recesses, and wherein the other of said members includes a protruding key element mounted for movement along said keyway between said stop recesses as said first and second members telescope or extend relative to each other.

24. The assembly of claim 23 wherein said clamping means comprises an adjustable clamp for attachment directly to the frame of a bicycle.

25. The assembly of claim 23 wherein said clamping means includes a second tube for mounting to the frame of a bicycle and an adjustable clamp for attachment to said second tube.

* * * * *